United States Patent [19]
Meyers et al.

[11] 3,944,837
[45] Mar. 16, 1976

[54] SYSTEM AND METHOD FOR GENERATION AND DISTRIBUTION OF ELECTRICAL AND THERMAL ENERGY AND AUTOMATIC CONTROL APPARATUS SUITABLE FOR USE THEREIN

[75] Inventors: William Foulks Meyers, Blue Bell; Oleg Serge Savinov, Northwales, both of Pa.

[73] Assignee: Savco, Inc., Ambler, Pa.

[22] Filed: Aug. 26, 1974

[21] Appl. No.: 500,251

[52] U.S. Cl.................... 290/40 R; 290/4 R; 290/2
[51] Int. Cl.²...................... H02P 9/04; F24D 3/02
[58] Field of Search.......... 290/2, 40, 4; 307/18, 45, 307/86

[56] References Cited
UNITED STATES PATENTS

| | | | |
|---|---|---|---|
| 1,009,320 | 11/1911 | Kitchen.............................. | 290/2 |
| 1,329,276 | 1/1920 | Sprong............................... | 290/4 C |
| 1,486,047 | 3/1924 | Smith................................. | 290/2 X |
| 1,552,661 | 9/1925 | Apple................................. | 290/2 |
| 1,761,849 | 6/1930 | Smith................................. | 290/2 |
| 1,935,289 | 10/1933 | Evans................................. | 290/4 R |
| 2,026,593 | 1/1936 | Pearson............................. | 290/4 R |
| 2,051,240 | 8/1936 | Berryman......................... | 290/2 |
| 2,076,382 | 4/1937 | Minton................................ | 290/2 |
| 3,076,096 | 1/1963 | Gorrie et al....................... | 290/4 R |

*Primary Examiner*—Robert K. Schaefer
*Assistant Examiner*—John W. Redman
*Attorney, Agent, or Firm*—Howson and Howson

[57] ABSTRACT

Instead of supplying all electrical current for residences or similar buildings from a single central station by way of distribution power lines, each building is also provided with its own engine-driven electrical generator the output terminals of which are connected to the power lines. The heat from the engine in each building is used in satisfying the thermal load for that building, for example to heat the building and the domestic hot water, and/or to supply heat for heat-input forms of air conditioners or refrigerators. Thermostatic control is used to turn the engine on and off as needed to perform its heating function. The electrical current generated while the engine is running is used to supply part or all of the electrical load in the building, and any excess is supplied to the distribution power lines. A two-way watt-hour meter registers the net electrical power flow in or out of the building to enable securing of credit for the current delivered to the power lines from each building. The local generators are enabled by their connection to centrally-activated power lines, so that upon a shutdown of the central station or a break in the lines to central, any local generator connected to the then-deactivated power lines will automatically be prevented from delivering current to the power lines, as a protection to persons who may be working with the supposedly "dead" lines. This system produces significant improvements in the efficiency of use of fuel in producing electrical and thermal energy, and reduces thermal pollution of the environment.

11 Claims, 5 Drawing Figures

SYSTEM AND METHOD FOR GENERATION AND DISTRIBUTION OF ELECTRICAL AND THERMAL ENERGY AND AUTOMATIC CONTROL APPARATUS SUITABLE FOR USE THEREIN

BACKGROUND OF THE INVENTION

The present invention relates to systems and methods for the generation and delivery of electrical and thermal energy, and to automatic control apparatus suitable for use therein; in particular, it relates to new and improved systems for generating electrical and thermal energy and for delivering it to distributed loads such as the electrical loads and thermal loads in homes.

Two of the most serious problems facing this nation and the world are the prospects of increasing fuel shortages and environmental pollution. These problems are presently somewhat interdependent, since many proposals to mitigate one problem would aggravate the other, and vice versa. While there is presently hope that systems at least partially solving these problems will be "on stream" by about the year 2,000 or so, the prospects for the intervening three decades or so have been considered quite bleak. What are urgently needed are safe solutions to these problems for the next few decades, preferably using presently available types of technology and approaches which will be acceptable to the general public. While it is of course always desirable to keep the costs of new systems as low as possible, the seriousness of the problems and the probable costs of any approach to a solution are such that very large national expenditures for capital investment in new systems can be tolerated and will probably be necessary in any case.

One approach to these problems lies in reducing the waste of energy sources such as fossil fuels. A large proportion of the energy obtained by burning such fuels is presently being wasted, and in many cases the disposal of the waste heat increases thermal pollution of the environment. A primary example of this occurs in connection with the present system of generating electricity centrally for use at distributed installations such as homes, by burning fossil fuels to release energy for operating a central electrical power generating station and distributing the centrally-generated electrical power to the distributed electrical loads by way of long distribution power lines. In typical systems of this type as much as about 70% of the heat energy from the fuel consumed at the central station is given off as waste heat, only the remaining approximately 30% being converted to electrical energy. There is little possibility of substantial improvements in the efficiency of this type of power generation at present, particularly in that the usual such system employing a heat engine to drive an electrical generator is limited by the fact that the engine will always release a substantial minimum amount of heat defined by its Carnot cycle.

While efforts are sometimes made to make use of some of the waste heat from such systems, as by using it to heat nearby homes with steam, such efforts are not presently useful at substantial distances from the central station; in most cases this is not attempted at all, and disposal of the waste heat becomes a problem in itself, requiring special equipment. Typically the waste heat is conveyed to the atmosphere immediately surrounding the power station by means of relatively costly air-cooling equipment and with attendant undesirable excessive local increase in air temperatures, or is conveyed to water-cooling equipment which is also relatively costly and results in dumping thermal pollution into rivers or other bodies of water. The supplying of necessary heat to distributed thermal loads in user installations such as homes, is ordinarily accomplished by the burning of fossil fuels in each user installation or home.

Aside from, and in addition to, such waste of energy at the central station, there is a very substantial loss in the generated electrical energy as it passes through the power distribution system by which it is conveyed to remote distributed user installations. Accurate, reliable and consistent data on the extent of this power loss are difficult to locate, in part perhaps because the providers of such data are often those associated with the power generating and/or distribution business, and are not interested in accumulating and presenting all information on all sources of overall distribution loss in actual systems, operating over long periods of time and under a variety of actual conditions. Thus, while figures of over 90% are often mentioned for efficiency of electrical distribution, there is good reason to believe that perhaps 70 to 80% may be a more realistic overall figure. Combining this with an approximately 30% generating efficiency gives an overall system efficiency of about 20 to 25%. When it is realized that the present annual fuel shortage in the nation, equivalent to about 1 billion barrels of oil per year, represents only about 40% of the fossil fuel energy used in generating electrical power, it is apparent that a 40% improvement in the overall efficiency of electrical power generation, from about 20–25% to about 60–65%, would be sufficient in itself to remedy such an annual fuel shortage.

Accordingly, it is an object of the invention to provide a new and useful system and method for generating electrical and thermal energy and for delivering it to distributed loads such as thermal and electrical loads in homes or other buildings.

Another object is to provide such a system and method which results in net reductions in energy waste as compared with present systems and methods.

A further object is to provide such a system and method which makes possible substantial reductions in the waste of fossil-fuel heat normally occurring at the central station of a centrally-powered electrical power system, and in the waste of electrical energy normally occurring in delivery of the centrally-generated electrical power to remote distributed loads.

It is also an object to provide such a system and method in which the amount of thermal pollution of the environment is reduced.

Another object is to provide such a system and method which provides a high degree of safety to the general public and to persons working on the system.

It is another object to provide apparatus, useful in said system, for assuring that a electrical generator normally connected to distribution power lines at a user installation remote from the central power station is enabled to supply electrical power to said distribution power lines only when it is connected to centrally-activated power lines.

SUMMARY OF THE INVENTION

These and other objects of the invention are achieved by the provision of a system and method according to which a central electrical power generating station is connected through distribution power lines to distributed electrical loads at remote user installations such as residences, and a plurality of said user installations are provided with respective distributed thermal and electrical power generating means, e.g. a heat-engine driven electrical generator; the thermal output of each distributed power generating means is supplied to heat loads at the user installation such as for area heating, hot water heating, heat-operated air conditioners etc., while the electrical output thereof is supplied to any associated electrical load such as lights or motors at the local user installation and any excess of electrical power beyond that locally required is delivered to the distribution power lines at that user installation for use at other user installations or elsewhere.

Preferably, each distributed power generating means is selected so that when operating it generates heat at a rate sufficient to be useful in satisfying the corresponding local heat load, and its operation is preferably automatically controlled to this end, as by a thermostat circuit. At any time when the local power generating means is not fully supplying the electrical load demand at the local user installation, the necessary power will be supplied over the power lines from the central station and/or from other distributed power generators which at that time may be supplying more electrical power than is then needed by their associated local electrical loads.

Preferably also, each distributed power generating means is enabled to deliver substantial electrical power to the distribution power lines only when it is connected to power lines then being supplied with voltage from the central station, i.e. only when connected to centrally-activated power lines. If then the central station shuts down or an open circuit occurs between the central station and any local distributed power generating means, the latter power generating means will be disabled from delivering electrical power to the power lines. In one preferred form, the local electrical generator is an induction generator requiring flow of a reactive current component between the central station and the local generator in order for it to supply energy current to the power lines; in other embodiments the central station sends over the power lines, or through a separate communications link, a control signal for enabling the local generator.

Means are also preferably provided for registering the net electrical energy flow between each user installation and the power lines, as by means of a two-way watt-hour meter which runs in the direction to increase meter reading when there is a flow into the installation and in the opposite direction when the flow is outward.

In the above-described system, the engine and generator used at each local user installation can be at least as efficient as existing heating systems in converting the fuel to heat and putting the heat to useful work. The electrical current generated during operation of the engine and generator is produced without substantial additional waste of heat; in addition, there is substantially no waste of electrical power in delivering the locally-generated current to the associated electrical load or to nearby electrical loads at nearby user installations. Accordingly, the overall energy efficiency in generating and delivering the locally-generated current to nearby loads is very high, for example over 90%, compared with perhaps 20–25% for current generated at and supplied from the central station. By selecting the engine and generator so that they operate a substantial fraction of the time during most of the year, and so that the generator puts out a relatively large current when operating, a large fraction of the total current consumed by such user installations can be caused to be supplied at the above-mentioned very high efficiency, with resultant large reduction in fuel waste and thermal pollution at the central station. Use of heat-input types of apparatus, especially air conditioners, instead of current-input types of apparatus at the user installations will permit the generation of the higher-efficiency current a greater proportion of the time, especially in the summer, thereby increasing the average efficiency for the entire system. However, preferably the central station is always called on to provide some of the current in the system.

The system of the invention uses apparatus and techniques which can readily be implemented now within the present state of the art, which are safe for persons working on the power lines, and which are not excessively expensive in view of the seriousness of the problem and the costs of alternative approaches.

BRIEF DESCRIPTION OF FIGURES

These and other objects and features of the invention will be more readily understood from a consideration of the following detailed description, taken in connection with the accompanying drawings, in which.

DESCRIPTION OF SPECIFIC EMBODIMENTS

Figure 1:
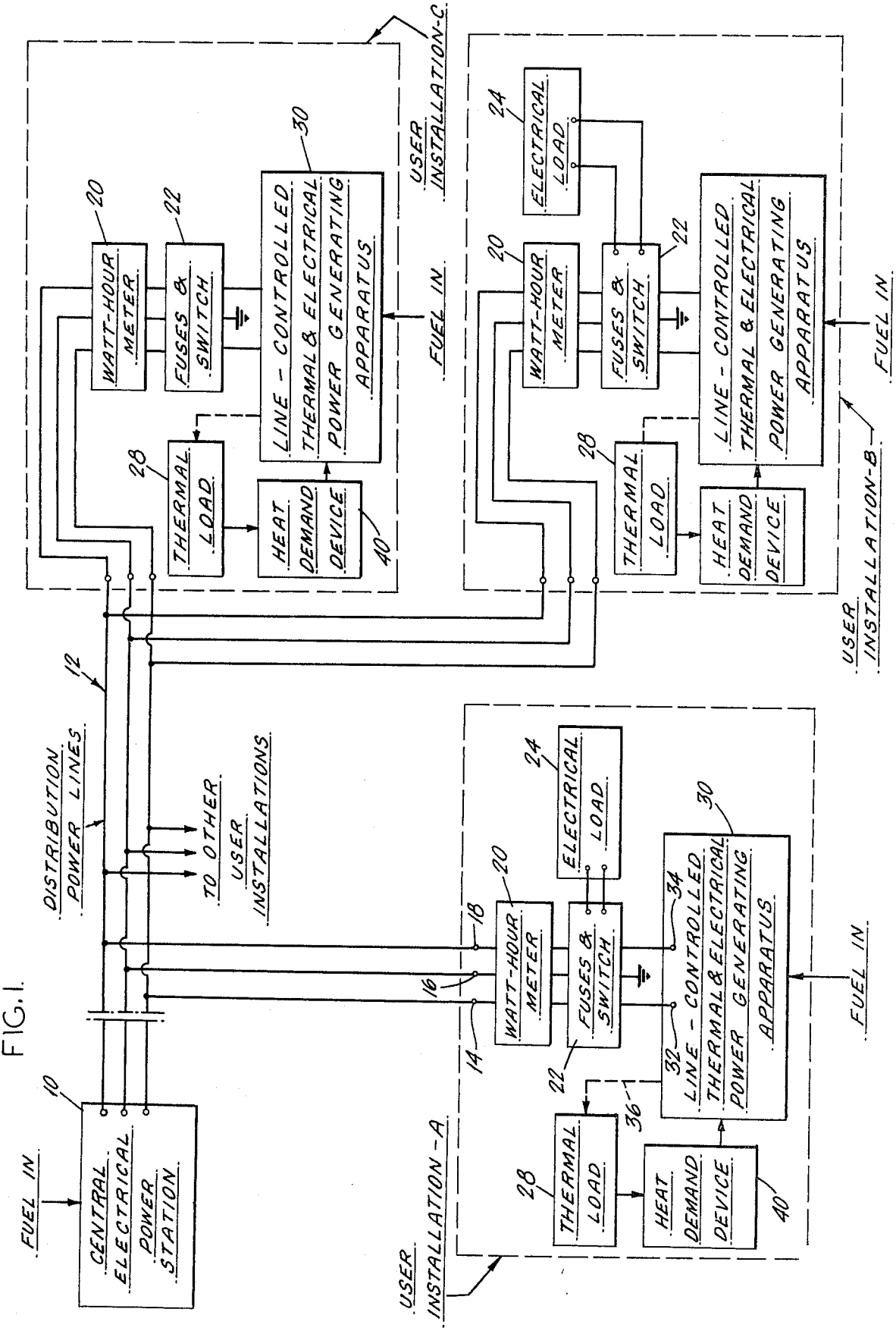
FIG. 1 is block diagram illustrating a system embodying the invention in one of its forms.

Referring now specifically to the embodiments of the invention shown in the Figures by way of example only, and without thereby in any way limiting the scope of the invention, FIG. 1 illustrates a central electrical power station 10 connected by distribution power lines 12 to three user installations designated as user installation A, user installation B and user installation C, as well as to other user installations which are not specifically shown. The central electrical power station 10 may, for example, be the usual attended utility-company electrical power generating station normally supplying electrical power to the distribution power lines for delivery to, and use by, users at the installations A, B and C. In this example, it will be assumed that the energy for operating the central power station is derived from the burning of a fossil fuel, although other energy sources may be used. It will be understood that other central means for generating electrical power may be connected also to the distribution power lines 12 by appropriate known means, such as power grids for example. It will also be understood that the power station 10 may contain all of the usual monitoring and control apparatus typical of such an attended power station, and that the power lines 12 may include all of the usual power-line equipment, including transformers, circuit breakers, manually-operable switches, etc., although none of these have been shown in the interest of clarity. The central power station is for the present purposes taken to include associated sub-stations, including those used to provide compensating reactive currents to the distribution power lines. By way of example, it may be assumed that the central wire in the power lines to each of the three installations shown, and to any other user installations, is a neutral line, and the two outer wires carry two opposite polarities of approximately 115-volt, 60-cps electrical power, although the system can be modified in a conventional manner to supply three-phase power.

User installation A may be a house, office building, store, warehouse, or other similar type of installation, but in the following it will generally be assumed that installation A represents a usual private house.

Accordingly, in user installation A there are shown three terminals 14, 16 and 18 at the house to which the external power lines are connected, the center line being locally grounded. Terminals 14 and 18 are connected through a watt-hour meter 20, and through fuses and switches 22, to the local electrical load 24. The electrical load 24 may, for example, comprise the lighting system, the heater elements of various heating or cooking appliances, and the various electrical motors commonly found in a house, as in laundry equipment, refrigerators, air conditioners, fans, etc. The portion of the system thus far described in detail represents a usual arrangement for supplying electrical power to equipment in a private home.

The typical user installation A will also include a thermal load 28, which may for example comprise the space within the house which requires heating in cold weather, the usual hotwater heater for providing domestic hot water, and any other type of equipment which requires the supplying of heat thereto. It may for example also include known types of air-conditioning apparatus which require a heat input to operate them. Normally in the past the thermal load has been satisfied by providing fossil-fuel burning heater systems, such as coal furnaces or oil or gas burners, and in other cases heating for the home has been by electrical current also derived from the main power lines.

As mentioned previously herein, inherent in such a normal arrangement are a high degree of waste of energy and unnecessary excessive environmental pollution. Where the central power station is fueled by fossil fuels, typically only about 30% of the fuel energy is converted into electricity at the power station, and due to losses on the distribution power line not all of this energy reaches the user installation. While consistent data on the magnitude of power distribution losses are difficult to find, from data available it is estimated that about 75 to about 80% of the energy available from the original energy source is wasted in the generation and distribution of electrical power in such a system.

In accordance with the invention, each user installation such as A is provided with a line-controlled thermal and electrical power-generating apparatus 30, which is fueled typically by fossil fuel input thereto and which, when fully operating, supplies electrical power from its terminals 32 and 34 for at least part of the load 24 and supplies any excess electrical power which it generates to the power distribution lines by way of the fuses and switches 22 and the watt-hour meter 20.

Importantly, when operating, apparatus 30 primarily generates heat, which is supplied to the thermal load 28 as indicated by the dotted line 36. In this embodiment, a heat demand device such as a thermostat 40 senses the temperature of the thermal load 28, and is connected to apparatus 30 to cause it to operate when more heat is required and not to operate at other times.

The result of this arrangement is that the apparatus 30 operates as is required to maintain the proper desired temperature of the thermal load 28, such as the house temperature, hot water temperature, etc., and when operating also provides electrical current not only for the electrical load 24 within the local installation but, if all of the current being produced by the apparatus 30 is not required by the local electrical load, it delivers electrical current also to the distribution power lines 14, 16 and 18 for use where required at other installations.

With this arrangement then, a substantial part of the electrical current required for the electrical loads distributed among the various user installations is supplied by corresponding distributed power-generating apparatuses such as 30. As to the electrical current which is thus supplied by each local generating apparatus to its associated or nearby local electrical load, the very substantial loss which would occur if it had to be delivered over the long distribution power lines from a central station is practically eliminated. In addition, and importantly, a large part of the heat generated by the distributed power-generating apparatuses such as 30 is put to use by delivering it to associated thermal loads such as 28. In fact, in the embodiment shown the heat demand device 40 operates the power generating apparatus 30 at those intervals, and for those lengths of time, necessary to satisfy the thermal load 28, and it is as a by-product of this heating operation that the above-described electrical output is produced by apparatus 30. When power generating apparatus 30 is not operating or is disconnected from the power lines, power for the local electrical load 24 is supplied from the distribution power lines in the usual way.

Accordingly, a net increase in overall efficiency and a corresponding reduction in total fuel required by the system is obtained by utilizing the distributed thermal and electrical power generating apparatuses such as 30 to supply corresponding local thermal loads such as 28 and, while operating, also to supply local electrical loads such as 24 while delivering any excess electrical power to the distribution power lines. This is in contrast to the usual situation in which the local electrical load is supplied only by the central power station, and the corresponding heat generated at the central power station is usually wasted and disposed of as environmental pollution rather than operating useful thermal loads; in addition, larger energy losses occur in the distribution power lines in the system using central station supply only.

User installation B is shown as identical with user installation A, and may represent, for example, another house connected to the same distribution power lines; it is understood that this arrangement may be repeated for many or all homes in a given area served by a given central power station or stations.

User installation C is the same as installations A and B, with the exception that the electrical load has been omitted, so as to represent a possible situation in which local heating is required but no electrical load is present, as for example in maintaining a sufficient temperature to prevent freezing of water pipe lines in a location where electrical current is not required. In this case substantially all of the electrical current generated as a by-product of satisfying the thermal load is introduced into the distribution power lines, with the advantage that the heat generated during electrical generation is put to a useful purpose rather than wasted and disposed of as environmental pollution.

It is noted that each of the power generating apparatuses such as 30 is designated as "line controlled". The nature of this control is such that the thermal and electrical power generating apparatuses at each of the user installations are enabled to supply electrical power to the distribution power lines 12 only when each such apparatus is connected to centrally-activated distribution power lines, i.e. power lines provided with required electrical current from a central station. If the distribution power lines are open-circuited at any point, whereby a workman working on the power lines beyond such open connection can expect to be dealing with "dead" lines, then none of the power generating apparatuses such as 30 will be operative to supply electrical power to the distribution power lines beyond the open circuit, and the worker will thus be protected from dangerous shock. In the absence of such an arrangement, any one of the distributed power generating apparatuses beyond the open circuit in the distribution lines could continue to operate and supply electrical power to the supposedly dead line, thus rendering it unsafe for a worker to handle such line.

The description of subsequent figures will disclose in more detail various arrangements which can be used to connect local electrical power generating apparatus to distribution power lines in a manner such that the local generating apparatus can deliver electrical power to the distribution power lines.

In the interest of clarity, the neutral line and the grounding of individual electrical devices within the user installations have not been shown in all cases in FIG. 1 or the subsequent figures, it being assumed that conventional safety practices with respect to grounding of all electrical devices is observed. Also, while a single-phase 230-volt system balanced to ground has been shown, a neutral and 230/115-volt connection may be used; as mentioned previously, polyphase (e.g. three-phase) power sources may be used and, especially when supplying an inductive local generator, can provide higher power factor and electrical efficiency although this will involve providing three "hot" wires to and within the local installation.

Also in the interest of clarity, the electrical power distribution system has been represented simply as comprising the power lines. In addition to devices such as transformers and switches, the distribution system may include apparatus for reducing the net reactive current in the power lines, such as capacitive devices for compensating the inductive currents to produce a net power factor nearer to unity. The effects of such apparatus in certain embodiments of the invention will be discussed hereinafter.

Figure 2:
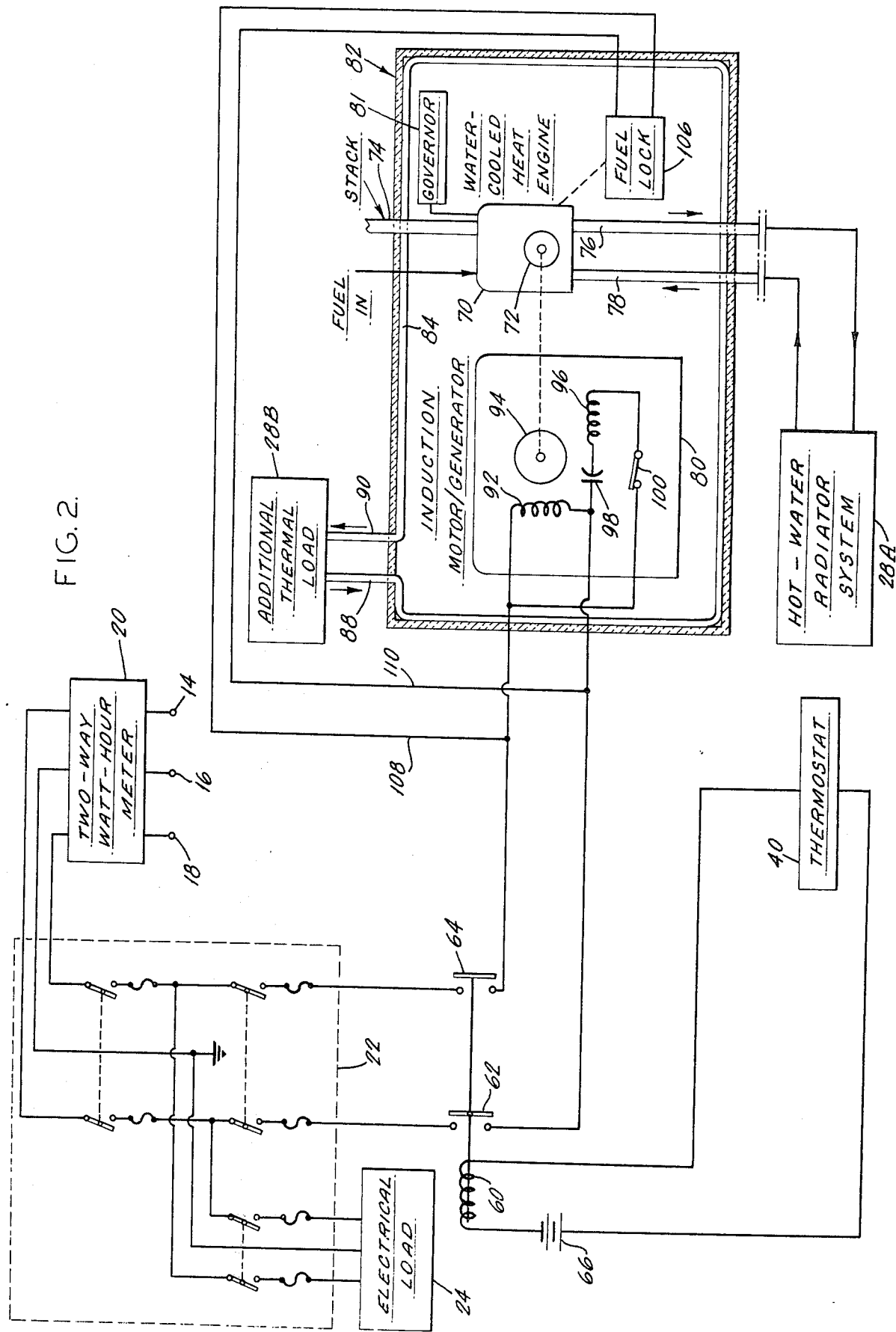
FIG. 2 is a schematic diagram, partly in block form, of one possible embodiment of user installation A of FIG. 1, in accordance with the invention.

FIG. 2 illustrates schematically further details of one possible embodiment of a typical user installation, such as user installation A in FIG. 1. Corresponding parts of FIG. 2 corresponding to parts of FIG. 1 are indicated by corresponding numerals. Thus, again, the distribution power lines are shown connected to terminals 14, 16 and 18, the line from connection 16 is grounded at the user installation, and connections 14 and 18 are connected by way of the two-way watt-hour meter 20 and appropriate line fuses and line switches 22 to the local electrical load 24 and to the local power generating apparatus. Separate switches and fuses may be used for different portions of the electrical load, as is conventional. The watt-hour meter 20, in this example, is "two way" so that it will register the net flow of electrical energy in or out of the user installation. That is, by utilizing a watt-hour meter of conventional form which runs in one direction when electrical power flows into the user installation, and runs in the opposite direction when electrical power flows out of the user installation, the indication on the meter at any time will show the net electrical energy taken from the distribution lines by the user installation. In this way, not only will the use of locally-generated electrical power at the user installation to supply the local electrical load reduce or eliminate increments in watt-hour meter reading, but in the case where the locally-generated electrical power exceeds the requirements of the local load, and current is transferred to the power lines, the conventional meter will actually be run in reverse so that the local installation will automatically receive credit for the electrical power it delivers to the power lines. Thus not only is the previously-described overall reduction in energy waste and environmental pollution obtained, but in addition the individual user may receive credit for the amount of electrical power which his local apparatus supplies to the common power lines. The overall fuel and cost-saving benefits of the invention may however be achieved even in the absence of the watt-hour meter, and other meter arrangements can be used instead, for example two directional meters registering respectively electrical energy in and out separately.

In the example of FIG. 2, the thermal load 28 is made up of a hot-water radiator system 28A and an additional thermal load 28B which may constitute, for example, a domestic hotwater heater or any other device requiring thermal energy for its operation. The heat demand device 40 is shown as specifically constituting a thermostat of the usual type placed in a room of the house to be heated by the hot-water radiator system, which thermostat may be assumed to close only when the temperature of the space to be heated has fallen below the desired temperature, and to open when the desired temperature is reached. Thermostat 40 is shown connected in series with relay coil 60, which operates its two-associated switch blades 62 and 64 to their closed positions only when current passes through the coil 60. A low-voltage supply 66 is also shown in series with the relay coil 60 to provide the latter current when the thermostat 40 closes, it being understood that the latter source is normally not a battery but typically is a source deriving its energy from the local higher-voltage house current in conventional known manner.

The remainder of the apparatus of FIG. 2 constitutes the line-controlled thermal and electrical power generating apparatus such as 30 of FIG. 1. It includes a heat engine 70 supplied with appropriate fuel, typically a fossil fuel such as gas, coal or oil. Operation of the engine involves burning of the fuel to produce rotation of the engine output shaft 72, with some unavoidable loss of heat through the exhaust stack 74. In the present example, the engine 70 is chosen not so much for its operating speed, power, or efficiency, but rather so that when operating it will generate heat at a great enough rate to produce satisfactory operation of the heat loads connected thereto through appropriate heat exchange means. More particularly, in this example engine 72 is shown to be a water-cooled heat engine, such as a diesel engine for example, the outlet pipe 76 of the water cooling system of which supplies hot water to the hot-water radiator system 28A, the return water from which returns to the engine through return pipe 78. If desired, the water outlet pipe 76 can be positioned so as to absorb even more heat from the engine, for example by coiling it around a portion of stack 74.

In this example, the engine 70 as well as the induction motor/generator 80 with which the engine cooperates are contained within a thermally-insulating housng 82, about the interior of which housing there extends a thermally-conductive inner liner 84 through which a flow of heat exchange fluid may be established by way of a fluid inlet 88 and a fluid outlet 90. The fluid in liner 84 therefore tends to absorb heat generated by any of the apparatus within the casing 82 and to deliver it to the additional thermal load 28B. It will be understood that the arrangement shown for producing heating of water by the cooling system of the heat engine, and for obtaining additional heating of a heat exchange fluid by means of the liner 84, have been chosen for simplicity and clarity of explanation, and in a sophisticated commercial system the heat exchange system would preferably be designed for maximum efficiency of heat exchange for all of the elements generating heat, principally the heat engine 70 and induction motor/generator 80. An overspeed governor 81 is also preferably provided to prevent run-away of the engine upon loss of load on the engine.

The induction motor/generator 80 may be of any of a variety of known commercial types, and in this example it is shown for simplicity as a single-phase capacitor-start type having a main winding 92, an associated rotor 94 mechanically coupled to engine shaft 72, a starter winding 96, a starter capacitor 98, and a centrifugally-operating normally-closed switch 100. The demand for heating of the radiator system, indicated by operation by thermostat 40, causes the switch blades 60 and 64 to close, thus connecting the main winding 92 across the power lines 14 and 18.

Also employed in this embodiment is a conventional fuel lock 106 which closes down the fuel supply or throttle of the engine 70 except when the fuel lock is supplied with electrical current over lines 108 and 110. As will become more apparent, fuel lock 106 will therefore prevent operation of the engine 70 whenever there is no voltage across the main winding 92 of the induction motor/generator.

In operation, closing of the contacts of the thermostat 40, indicating a demand for heat from the radiator system 28A, causes contacts 62 and 64 to close, thus supplying alternating line power across main winding 92 as well as across the combination of starting capacitor 98 and starter winding 96. At the same time, the fuel lock 106 is released by the current supplied to it, permitting the supply of operating fuel to the heat engine 70. Induction motor/generator 80 will then begin to operate as a motor, turning the rotor 94 and initially driving the engine shaft 72 to start the engine. Once the engine is started, it speeds up until it drives the rotor 94 of induction motor/generator 80 above synchronous speed, causing the latter device to operate as an induction generator; in the meantime, the rotation of the rotor 94 has caused the centrifugally-operated switch 100 to open, thus disconnecting the starting circuit 96, 98.

Under the operating conditions thus established, the engine 70 generates heat which heats the water used therein to cool the engine; this water is circulated outward through outlet pipe 76, through the hot-water radiator system 28A, and back through return pipe 78 to the engine. In this way, the demand for heat signaled by the thermostat 40 is satisfied. Additional heat is also delivered to the additional thermal load 28B. At the same time, the induction motor/generator 80 is generating electrical power which is delivered to the electrical load 24, to supply it entirely or in part; where the electrical load is less than that which the induction motor/generator can supply, excess electric power is delivered through the two-way watt-hour meter 20 to the distribution power lines 14 and 18.

When the heat demand has been satisfied, thermostat 40 opens, the switch blades 60 and 62 open, the main winding 92 of the induction motor/generator 80 is thereby disconnected from the centrally-activated power lines and, because the main winding 92 is no longer connected to the centrally-activated power lines, the induction motor/generator inherently no longer produces output electrical power. The fuel lock 106 is thereby no longer energized, and it causes the engine 70 to be shut down so that heat is no longer generated for the radiator system until such time as the thermostat again closes. While the induction motor/generator is shut down, current for the electrical load 24 is supplied from the external centrally-activated distribution power lines.

It is particularly noted that the induction motor/generator 80 will not deliver power to the distribution power lines even if its rotor is being turned above synchronous speed, unless the power lines to which it is connected are centrally-activated; if these lines are open anywhere between the local user installation and the central station, or if the central station is shut down, the induction generator will not deliver power to the lines to which it is connected; furthermore, it will not deliver such power even though the distribution lines to which it is connected are also connected to other induction motor/generators in other local user installations. This is an inherent property of this type of induction motor/generator, which enables it, in effect, to serve as a sensor of the presence or absence of centrally-activated power lines connected across its main winding. As a result of this feature, distribution power lines isolated from the central station by an open-circuit will not be supplied with power from any of the induction generators in any of the local installations, and hence these isolated power lines will remain dead as desired, making them safe for handling by the linemen or others working on such lines. Once shut down, the distributed generators will remain shut down until the connection to centrally-activated power lines is resumed.

Figure 5:
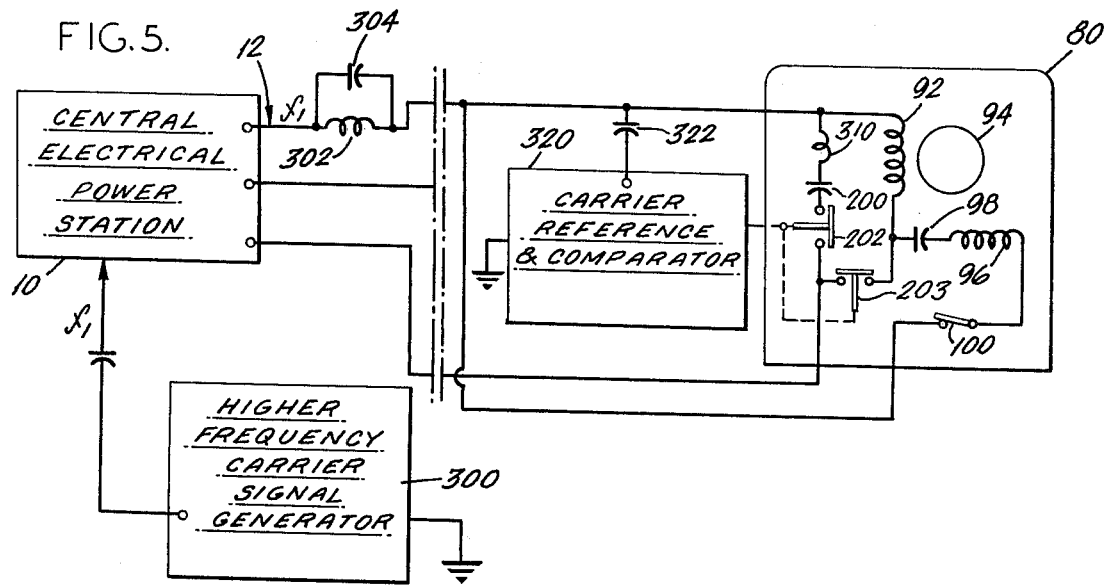
Figure 4:
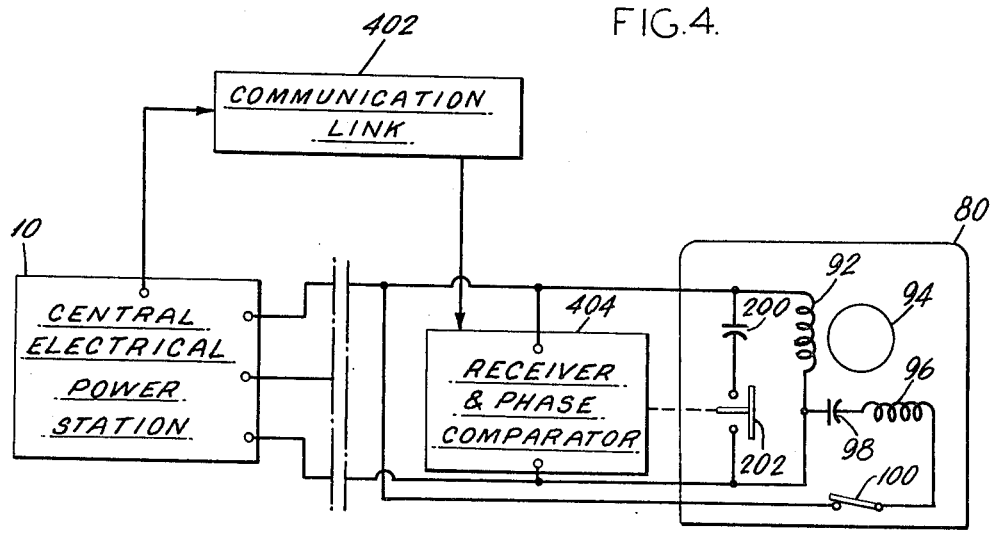
FIG. 4 is a schematic diagram, partly in block form, illustrating certain modifications to the system of FIGS. 1 and 2, the right-hand break line in FIG. 4 being located at the two input lines to main winding 92 in FIG. 2; and, FIG. 5 is a schematic diagram, partly in block form, illustrating alternative modifications of the system for enabling the local electrical generators to supply power to the power lines only when they are connected to centrally-activated power lines.

It is noted that the arrangement of FIG. 2 makes use of the fact that when the local power generating apparatus is disconnected from centrally-activated power lines by a break or by shutting down of the central station, the remaining electrical load then presented to the local generator is resistive or inductive or a combination of both, and does not present a net capacitive reactance. Thus lighting and heating loads are normally nearly entirely resistive, and most motor loads are inductive. In some cases, however, capacitive means are connected to the power lines by the operators of the central power system to compensate and eliminate at least in part the usual inductive components of currents, thus reducing the amount of wasteful net reactive current in the power lines. Normally the amount of such compensating capacity connected to the power lines is less than or substantially equal to the amount required to compensate the inductive current components, and hence will not change the basic operations described in connection with FIG. 2. Also, any such capacitive means is normally located near a strong concentration of highly inductive loads such as an industrial plant for example, and it is therefore unlikely that a line break will occur in such a location as to greatly increase the component of capacitive reactance affecting the local power generating apparatus. Nevertheless, for greatest safety the design and operation of the entire system should take this problem into account by strategic selection and location of any such compensating capacitive means, or by using special automatic disconnecting means such as are shown in FIGS. 4 and 5 to disconnect the capacitive means when it might create a problem by permitting one or more local generators to continue to operate even when they are not connected to centrally-activated power lines.

Figure 3:
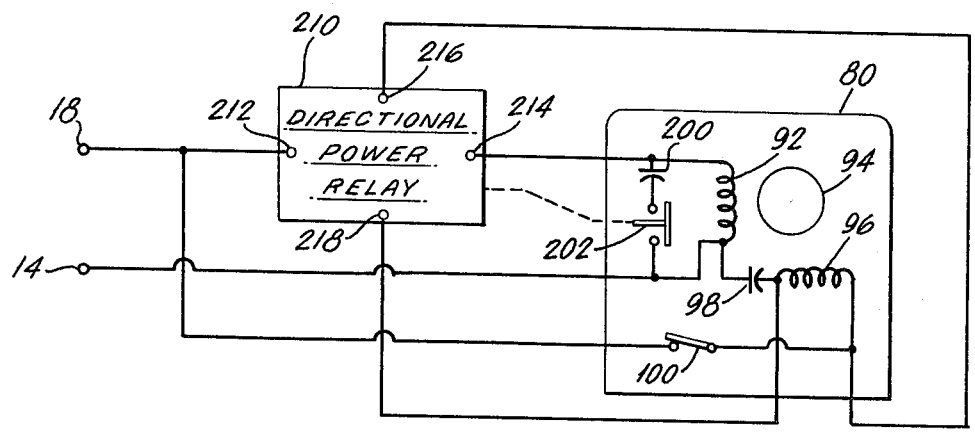
FIG. 3 is a schematic diagram, partly in block form, illustrating an alternative embodiment of a portion of the apparatus of FIG. 2.

FIG. 3 illustrates an alternative arrangement of the induction motor/generator and associated circuitry for assuring that potentially dangerous amounts of electrical power are not delivered to the distribution power lines except when the generator is connected to centrally-activated power lines. In this example, the generator arrangement is the same as that shown in FIG. 2 with the exception that a capacitor 200 is positioned to be connected in parallel with the main coil 92 when, and only when, the switch 202 is closed. Switch 202 is spring-biased normally open, and when it is open the circuit acts like that of FIG. 2 in that whenever the main winding 92 is not connected to centrally-activated power lines it will not deliver power to the terminals 14 and 18. When switch 202 is closed, it converts the generator to a so-called capacitor-excited induction generator.

With capacitor 200 disconnected, the winding 92 draws a substantial lagging quadrature component of current from the line when acting as a motor, and when acting as a generator it delivers current with a large capacitive quadrature component.

While such an arrangement, as shown in FIG. 2, provides strong positive assurance that power will not be delivered by the generator except when connected to centrally-activated power lines, the large leading capacitive component of current which it delivers is somewhat awkward for the system to handle, although it can be accomplished by known power system techniques. The connection of the capacitor 200 in parallel with the generator winding 92 reduces this delivered capacitive component to a small but detectable value. However, as a result, unless something else is done, it is not then as positively assured that the generator can deliver power to the distribution lines only when the distribution lines are centrally activated.

Accordingly, in the embodiment of FIG. 3 a directional power relay 210 is so connected in the circuit as to sense the flow of reactive current through it in either direction. The absence of such reactive current flow in the proper direction is an indication that the generator main winding is not connected to centrally-activated power lines, and the directional power relay under such circumstances permits switch 202 to open, returning the circuit to the form shown in FIG. 2 and preventing delivery of harmful electrical power to the terminals 14 and 18 by the generator under such circumstances. Thus connection of centrally-activated power lines to the terminals 14 and 18 not only enables the induction generator, but also converts it to a high power factor (e.g. 0.9) generator delivering a current which is only somewhat capacitive, with practical advantages attendant thereto.

More particularly, by using the starting winding in effect as a 90 degree phase changer, the directional power relay 210 may be of an available commercial type in which current passing from its terminal 212 to terminal 214 is compared with the voltage between its terminals 216 and 218 to produce an output action for closing switch 202 only when said current has a component lagging said voltage and of at least a predetermined minimum magnitude. In this example, terminals 212 and 214 are connected in series between terminal 18 and the upper end of main winding 92 to sense the current through the main winding plus capacitor 200 when the capacitor is connected in circuit; terminals 216 and 218 are connected across starter winding 96 to derive a voltage in quadrature with line voltage. Since winding 96 is in effect a phase changer connected across terminals 14 and 18, the voltage across it is also that applied across the winding 92 but at phase quadrature.

In operation then, when the line switch on the local user installation is first closed to connect the local system to the main power lines, switch 202 is open and centrifugal switch 100 is closed. The main winding 92 plus starter winding 96 will immediately draw current during start-up. During acceleration of the motor to beyond synchronous speed, centrifugal switch 100 will open and the starter winding 96 will be disconnected. Switch 202 will then be held closed by power relay 210 in response to the inductive current through the parallel combination of main winding 92 and capacitor 200 while the generator is operating. Directional power relay 212 and its connections therefore serve as an additional and more sensitive means for sensing that the generator main winding is in fact connected to centrally-activated power lines, and for affirmatively preventing the generator from delivering power to the distribution power lines when it is not connected to centrally-activated power lines.

FIG. 4 illustrates an alternative arrangement for assuring that the induction generator will not deliver power to the distribution power lines unless such lines are connected thereto and centrally activated. In this arrangement, the induction motor/generator construction and circuitry are the same as in FIG. 3, but the control of the operation of switch 202 differs as follows. At the central power station 10 there is generated a signal representing the exact phase of the centrally-generated alternating line voltage. This phase-representing signal is transmitted through a communication line 402 to a receiver and phase comparator 404, the latter device in turn being connected in parallel with the main winding 92 of the motor/generator 80. Receiver and phase comparator 404 is thereby supplied with the alternating current from the power station 10 so long as the main winding 92 is in fact connected to centrally-activated power lines; at the same time it is supplied with the central-phase representing signal from the communication line 402. Receiver and phase comparator 404 then compares the phase of the signal delivered to it from communication link 402 with the phase of the voltage across main winding 92, and holds switch 202 closed only when these two signals remain in proper phase relation to each other.

As one example, the communication link 402 may comprise a telephone line carrying a 60-cycle signal derived directly from the output of the central power station 10, and receiver and phase comparator 404 may constitute a conventional phase-comparing circuit for producing a signal through the relay coil therein only when the telephone-wire delivered signal is in fixed phase relation to the signal across exciter 92. The communication link may instead modulate the 60-cycle signal from the power station upon a carrier for transmission to receiver and phase comparator 404 over a telephone line, the latter device then serving to detect the carrier-modulated signal prior to phase comparison. As a further alternative, communication link 402 may be a space communications system by which radio signals modulated in accordance with the alternating output of power station 10 are radiated to the receiver and phase comparator 404, which receives and detects the radiated signals prior to phase comparison with the signal across exciter 92. Again, more sophisticated communications techniques may be used to improve reliability in the presence of electrical noise.

FIG. 5 illustrates an alternative modification of the system of FIGS. 1 and 2 to provide positive assurance that the induction generator will not deliver power to the distribution lines unless they are centrally activated and connected across the generator main winding. In this example a carrier signal generator 300, preferably located at or adjacent the central power station 10, applies a carrier signal of predetermined higher frequency $f_1$ to either of the "hot" lines from the central power station. This higher-frequency signal is carried by the power lines throughout the system; typical of frequencies which can be employed are those in the range from about 100 to 130KHz. At any point in the system where there is a reactance which might tend to eliminate the carrier signal, for example a series inductor such as 302, appropriate additional circuitry, such as the capacitor 304 in shunt with the inductor, is preferably provided to assure that the carrier signal will in fact pass throughout the system and into each user installation, so long as the central power station is operating and there is no line break, and without preventing the power-frequency currents from also being supplied throughout the system. FIG. 5 shows use of an induction motor/generator 80 the same as that in FIG. 3, except that a small series choke coil 310 has been added to limit surge current on closing of capacitor 200, and in that an additional normally-open switch 203 has been added in series with the main winding 92 as shown. Also, in place of the power relay 210 there is employed a carrier reference and comparator 320 connected to the line supplying main winding 92, by way of series capacitor 322. Carrier reference and comparator 320 may contain a resonant circuit sharply tuned to the carrier reference frequency $f_1$ and a relay circuit arranged so that only when the carrier signal is supplied to it by way of capacitor 322 will it close the switches 202 and 203. When switches 202 and 203 are not so closed, the generator 80 is affirmatively disabled regardless of any other circumstances; therefore the value of capacitor 200 is no longer criticial for disabling the generator, and can therefore be chosen to satisfy other design objectives. While the carrier reference, for simplicity, is preferably a tuned circuit the resonant frequency of which is effectively compared with the frequency of the signal supplied to it through capacitor 322, one may also utilize a frequency-stable generator for producing a reference signal having frequency $f_1$ equal to that of the carrier signal, which locally-generated carrier signal is compared in unit 320 with the signal supplied through capacitor 322 to operate the switch 202 only when the received signal and the locally-generated signal are of the same frequency $f_1$.

In order to assure that the carrier signal reaches the user installations only when the central power station is operating, the arrangement for supplying the carrier signal to the power lines should be such that it is not so supplied when the output terminals of the central station are disconnected from the power lines. This is readily provided for by either (a) applying the carrier signal on the side of the central station output switch to which the central generator is connected, so that opening the output switch will disconnect the carrier signal from the power lines, or (b) by powering the carrier signal generator from the side of the output switch to which the power lines are connected, so that opening of the central station output switch cuts off operating power from the carrier signal generator, rendering it inoperative.

It will be understood that other types of identifiable signals may be sent over the power lines from the central station to the distributed local power generating apparatuses at the user installations to indicate the connection to a centrally-activated line. For example, one may use carrier signals modulated by lower-frequency sine waves or by periodic pulses; pulse-coded modulation or any of many other communications techniques may also be used to reduce the effects of chance interference.

The arrangements of both FIG. 3 and FIG. 4 serve automatically to connect the capacitor 200 in parallel with the exciter winding 92 only so long as the main winding is connected to centrally-activated power distribution lines, at such times permitting the induction generator to operate as a capacitor-excited alternator with resultant practical advantages; if at any time the main winding 92 is no longer connected to centrally-activated power lines, the frequency and/or phase of the signal across winding 92 will no longer be identical with the corresponding frequency and/or phase of the current generated by the power station 10, the switch 202 will open, the motor/generator circuitry will return in effect to that shown in FIG. 2, and the generator will no longer be able to deliver power to the distribution power lines.

It is also noted that at least the arrangements of FIGS. 4 and 5 are readily adapted to use with local power generators other than the induction motor/generator-type, since for example the output of the carrier reference and comparator 320 or of the receiver and phase comparator 404 may be used automatically to shut down or isolate from the lines any type of local distributed power-generating apparatus whenever it is not connected to centrally-activated lines. This can be done, for example, either by shutting down the engine driving the generator, or by disconnecting the generator from the power lines, or by discontinuing alternator excitation currents. Methods which disconnect the generator output from the power lines, rather than shutting down the engine, are particularly adapted for arrangements in which the output of the local generator is then shifted over to supply the local electrical load without connection to the distribution power lines, thereby permitting the thermal and electrical generation of power at the user installation to continue at such times.

By way of example only, a local, distributed thermal and electrical power generator for use in supplying sufficient heat for area heating, hot water, and thermally-powered air conditioning in an average size house may use about a 12 horsepower oil-fired diesel engine driving a 7 kilowatt generator and producing about 90,000 BTU per hour when operating. It is contemplated that the distributed engine and generator will be of the unattended class, requiring no personal monitoring or control other than routine adjustment and maintenance such as is noramlly provided for other domestic heating and cooling apparatus. In the case of multiple residences, stores and commercial establishments of similar size and requirements, it is contemplated that the distributed generators used will in each case be less than 100 kilowatt units. The local electrical generator may in some applications produce quarter phase, three phase or other phase types of output, at any desired voltage such as 115 volts, 230 volts or other voltage. The engine may be of any type generating heat at a rate sufficient for the particular application, and may drive the load generator directly or through any coupling arrangement including gears, belts, torque converters or other. A starting winding need not be used in the generator, since other known starting means may be employed. Also, in a possible power distribution system differing from those now typical, capacitive reactive current may be in excess in the distribution lines instead of inductive reactive current, in which case a capacitive reactive current could be used as the enabling current for the local induction generators. It is also understood that any and all usual safety devices can be used at the user installations, such as stack switches, flame sensors, directional power relays and so forth. In addition to the line safety provided by the above-described fail-safe enabling circuits, it is also possible to utilize apparatus which will sense one or more of the speed, load, voltage, frequency and/or current of the local generator and disable the generator when the values of these parameters indicate abnormalities suggesting that the local generator is no longer connected to centrally-activated power lines.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. In a power generating and distributing system including central station means for generating electrical power, local user installations having electrical loads requiring electrical power and having useful time-varying thermal loads requiring thermal power, and distribution power lines for interconnecting said central station means and said electrical loads at said local user installations, the improvement comprising:

a plurality of distributed local power generating means, each at a different one of a plurality of said user installations, and each comprising local mechanically-operable electrical generating means and local heat engine means for operating said local generating means, means for connecting the electrical outputs of said local electrical power generating means to said power lines, heat exchange means for delivering thermal power generated by said local power generating means at each of said user installations to corresponding ones of said thermal loads and means for controlling the operation of each of said local heat engine means to vary the quantity of said delivered thermal power in response to the quantity of thermal power required by the corresponding associated thermal load and so as to supply said required thermal power;

said means for controlling the operation of each of said local heat engine means comprising means for varying in the same sense the thermal power and electrical power generated by the corresponding one of said local power generating means, whereby increases in said generated thermal power are accompanied by increases in said generated electrical power while substantially all of said generated thermal and electrical power are usefully employed.

2. The system of claim 1, wherein said means for controlling the operation of each of said local heat engine means comprises automatic control means at each of said user installations, responsive to the heat demand of the corresponding one of said thermal loads to render said corresponding local heat engine means intermittently operative as required to satisfy said heat demand.

3. The system of claim 1, comprising means for automatically enabling each of said local electrical power generating means to deliver electrical power to said power lines only when the output terminals thereof are connected to portions of said distribution power lines which are then activated by said central station means.

4. The method of generating and delivering electrical and thermal power to local electrical and thermal loads at a plurality of user installations interconnected by electrical power lines supplied from central power station means, comprising:

providing an engine-driven electrical generator at each of said installations, supplying heat generated by operation of said engine and generator to the associated local thermal load, automatically controlling said engine-driven generator in response to the heat demand of said thermal load to operate it so that said supplied heat substantially matches said local thermal load, and so that the electrical power generated by said generator increases substantially when said heat generated by said engine increases, supplying current from said generator to the associated local electrical load when said generator is operating, and at such times also supplying to said power lines any excess of current being generated beyond that then required by said associated electrical load, whereby substantially all of said generated heat and current are usefully employed.

5. The method of claim 4, comprising the step of enabling each of said local electrical generators only in response to a current supplied thereto from said central power station means.

6. The method of claim 5, comprising the step of sensing and registering the electrical power delivered to said power lines at each of said local electrical generators.

7. A heating system comprising electrical generator means, means for connecting the electrical output of said generator to distribution power lines, engine means for driving said generator means, heat exchange means for delivering to a heat load heat generated by operation of said engine means and generator means, and control means for automatically controlling the operation of said engine means in response to the heat demand of said heat load so that said delivered heat matches the heat demand of said heat load and in a manner to vary the electrical output of said electrical generator means in the same sense as said heat generated by said engine means and said generator means, whereby substantially all of said generated heat and electrical output are usefully employed.

8. The heating system of claim 7, in which said control means is operative to start and stop said engine means in accordance with the heat demand of said load.

9. The system of claim 1, in which said means for controlling the operation of each of said local heat engine means comprises means for varying the rate of operation of said each local heat engine means so as to match said delivered thermal power to said required thermal power.

10. The method of claim 4, in which said automatically controlling said engine-driven generator comprises varying the rate of operation of said engine to match said supplied heat to that required by said local thermal load.

11. The method of claim 5, in which said varying of said rate of operation comprises operating said engine when said associated thermal load demands heat and stopping said engine when said associated thermal load is satisfied.

* * * * *